June 11, 1935. I. H. JUDD 2,004,439
AUTOMOBILE LOADING AND CARRYING MEANS
Filed Aug. 6, 1934 10 Sheets-Sheet 1

INVENTOR
Irving H. Judd
ATTORNEYS

Patented June 11, 1935

2,004,439

UNITED STATES PATENT OFFICE 2,004,439

AUTOMOBILE LOADING AND CARRYING MEANS

Irving H. Judd, Detroit, Mich., assignor to Whitehead & Kales Company, River Rouge, Mich., a corporation of Michigan Application August 6, 1934, Serial No. 738,750

11 Claims. (Cl. 296—1)

This invention relates to motor vehicle transports of that type in which a plurality of motor vehicles are carried thereon in superposed tiers. Heretofore it has been the practice to mount the upper tier of cars in exposed position while the lower tier may be enclosed and thus protected from the weather. Such a construction and arrangement permits of easy loading and unloading of the cars, but has the disadvantage that the cars in the upper tier are not protected from the weather. It is the object of the present invention to obtain a construction where all of the cars in both lower and upper tiers are stored within an enclosure and which at the same time provides for easy loading and unloading. It is a further object to obtain a more or less streamlined form of enclosed body and one utilizing to the greatest advantage the storage space therein so that a minimum external area is exposed to wind resistance. It is also an object of this invention to obtain the maximum loading space, to take the longest and largest models of automobiles possible within this enclosed trailer and still keep the truck-trailer combination within the statutory law limit of operation upon the highway. With these objects in view, the invention consists in the construction as hereinafter set forth.

In the drawings:

Figure 6 is a view similar to Figure 1 showing a modified storage of the vehicles in the transport;

Figure 18 is a perspective view of the frame of the transport without the sheeting and viewed from the front end;

Figure 19 is a similar view viewed from the rear end;

My improved transport comprises a skeleton frame including a series of spaced arches A which are transversely connected at the bottom by suitable cross bars A' and are longitudinally connected at the top and bottom by side rails $A^2$ and $A^3$. A floor B rests upon and is secured to the cross bars A'. Preferably the upright members $A^4$ and also the bottom cross bars A' are formed of flanged channel bars, while the top $A^5$ of each arch is formed of tubing of an inverted U-shape having the lower ends thereof connected into the channels of the members $A^4$. At its forward end the floor of the frame has an upwardly stepped portion D for extending over the truck platform and provided with the usual king pin D' for pivotally engaging a fifth wheel on said platform. Near its rear end the frame is supported on an axle E connected by walking beams E' with tandem wheels E². These wheels are arranged in recesses in the sides of the frame so as to obtain the maximum width of body while maintaining the wheels within the limit of width prescribed by highway regulations. This necessitates cutting away the lower portions of certain of the arches, and to properly strengthen the frame and carry the load into the axle there are arranged inside of the wheel recesses above the floor, beams B' shown as of a Z-bar cross section. This skeleton frame is without diagonal bracing, but is provided with sheet metal sheeting F. As shown, the upright members A⁴ and top and bottom side rails A² and A³ form a series of substantially rectangular side frame bays A⁸. The side sheeting F is connected to each of these bay frame elements A², A³ and A⁴ and forms a plate girder which constitutes a load carrying member of the body structure of the trailer as well as a sheeting or outer covering therefor. Heretofore the frame structures of such bodies have been constructed to carry the load without the cooperation of the covering, but in the present instance the frame structure and sheeting are so constructed that both cooperate to carry the load. As a result, frame structure parts heretofore found necessary have been dispensed with entirely and lighter parts are employed, thereby making the over-all weight of the completely enclosed structure materially less.

Figure 1:
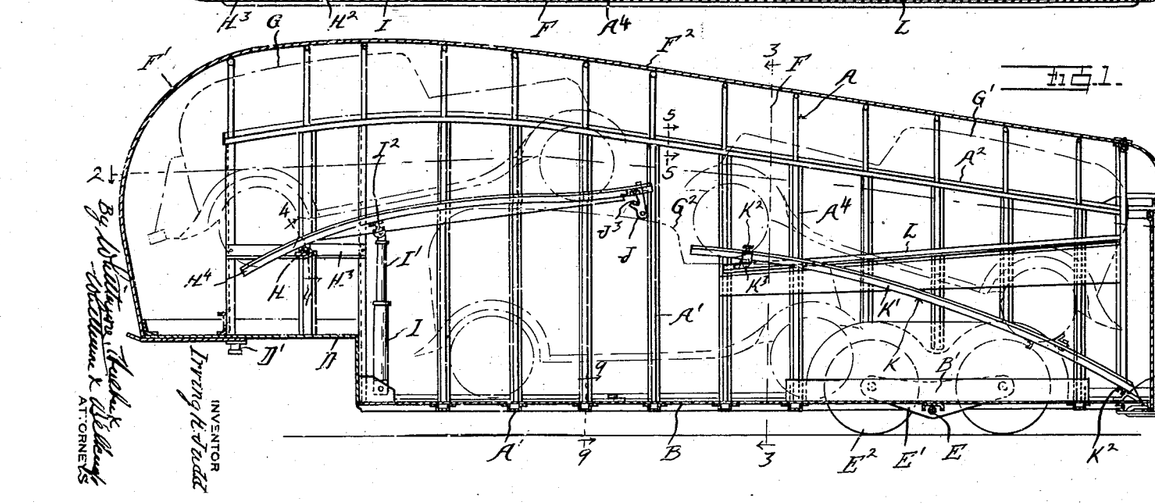
Figure 1 is a vertical longitudinal section through the transport.

The upright members A⁴ are not all of equal height, the highest being at a point slightly in rear of the step D and from this point diminishing in height towards opposite ends. This imparts to the body a streamlined form and when covered by sheeting F, it will have a rounded forward end portion F' with a top F² sloping upward to the point of greatest height and from there having the downwardly sloping portion F² extending to the rear end. The shape is such as to accommodate in the forward portion an automobile G facing rearward and arranged just below the roof, the front wheels of the car being higher than the rear wheels so as to raise the hood to near the height of the rear portion of the body. Another automobile G' facing forward and with its front wheels raised above the level of the rear wheels will be accommodated by the rear portion of the body and beneath the automobile G and G' there is space for a third automobile G² facing rearward and extending from a point just in rear of the step D with its hood portion beneath the forward wheels of the automobile G', as shown in Figure 1.

Figures 11, 12, 16, 17:
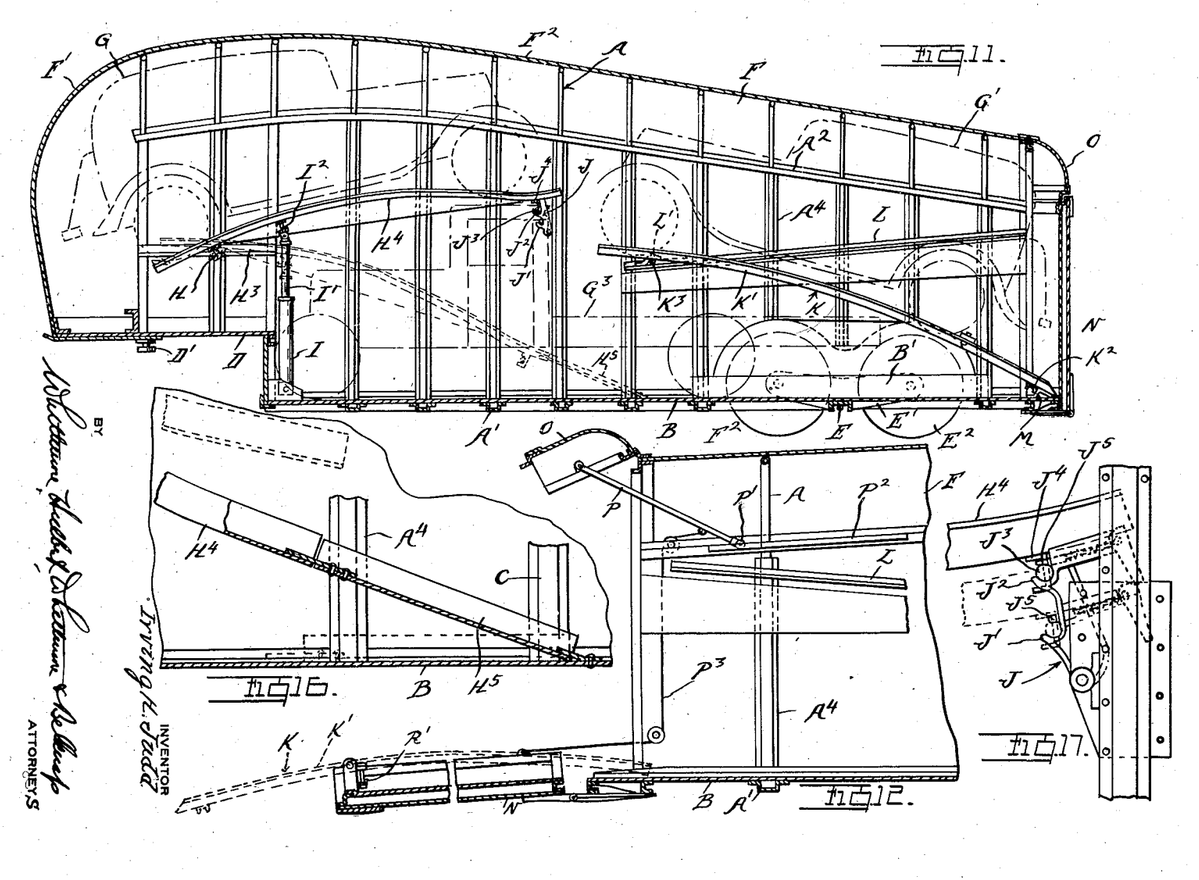
Figure 11 is a view similar to Figures 1 and 6 showing another storage arrangement of the vehicles within the transport.
Figure 12 is a vertical section through the end portion of the transport showing the rear tracks arranged as a skid for loading the first and second cars and also illustrating the means for simultaneously operating the tail gate and cap or hood therefor.
Figure 16 is a side elevation of the forward track member, partly broken away.
Figure 17 is an enlarged elevation showing the detent for holding the forward track in elevated position.

To permit of storing the cars within the body in the positions just described, I have provided the following construction. In the forward portion of the body above the step D is arranged a transversely extending beam H which at its opposite ends has pivot pins H' engaging bearings H² supported on shelves H³ secured to the adjacent upright A⁴. Mounted on this beam are track members H⁴ which are suitably spaced to correspond to the gauge of the automobile wheels and which are of channel cross section to provide side guide flanges for said wheels. The tracks H⁴ in normal position incline downward toward the rear and rest either directly on the floor or as shown in Figure 16, detachably engage cooperating track sections H⁵ hinged to the floor. These tracks thus form a runway on to which the first car G may be backed so as to elevate its rear end into the position indicated in Figure 1. The car can then be clamped to the tracks H⁴, after which they are swung upward, turning upon the pivot pins H² so as to bring the entire car into the position indicated. The raising of the tracks is accomplished by jacks, preferably a pair of hydraulic jacks having cylinders I and pistons I', the latter being pivotally connected at their upper ends to a cross beam I². The cylinders I at their lower ends are pivotally supported upon the floor of the transport adjacent to the step D and any suitable means of providing fluid under pressure may be used for operating the jacks. In normal position the tracks H⁴ are supported by the jacks and the track sections H⁵ overlap and are supported by the tracks H⁴. When the tracks H⁴ are raised, they disengage from these sections H⁵ which then fall down upon the floor to be out of the way of the car G². The height to which the tracks H⁴ are raised depends upon the type of car that is to be stored therebeneath. Thus, as shown in Figure 11, the car G is raised slightly higher than as shown in Figures 1 and 6 to give greater clearance for the truck G³ which is driven thereunder. The tracks H⁴ are locked in raised position by hinged members J mounted on opposite sides of the body and provided with a plurality of hooks J', J² for engaging pins J³ which project laterally from cross bars J⁴ of the track frame. Thus, in Figures 1 and 6 the pins J³ are engaged with the lower hooks J' while in Figure 11 they are engaged with the upper hooks J². In each of these positions they are securely locked by spring bolts J⁵.

For positioning the car G', I have provided a track frame K which also serves as a skid for loading the first and second cars into the transport. This track frame K comprises a pair of properly spaced track members K' and connecting cross bars K². The front cross bar K² has mounted on its opposite ends wheels or rollers K³ which are adapted to run upon tracks L mounted upon the upright members A⁴ at opposite sides of the body. The tracks L extend from the rear end of the frame forward and preferably inclining slightly downward towards their forward ends. This permits of lifting the track frame after it has been used as a skid for loading the forward cars and engaging the rollers K³ with the tracks L and then moving the frame forward until said rollers are arrested by engaging stops L'. The rear ends of the tracks are then secured by engaging the cross bar K² with stop bracket members M mounted on the floor of the transport. There are also provided clamping plates M' projecting from said cross bar K² which are apertured to register with corresponding apertures in the brackets M. A bolt M² is passed through the aligned apertures and is engaged by a handled nut M³ which securely clamps the plate M' to the bracket. It is thus evident that the car G' may be driven into the transport up the inclined tracks K' into the position indicated, which will raise it a sufficient distance to clear the intermediate car.

Figures 13, 15:
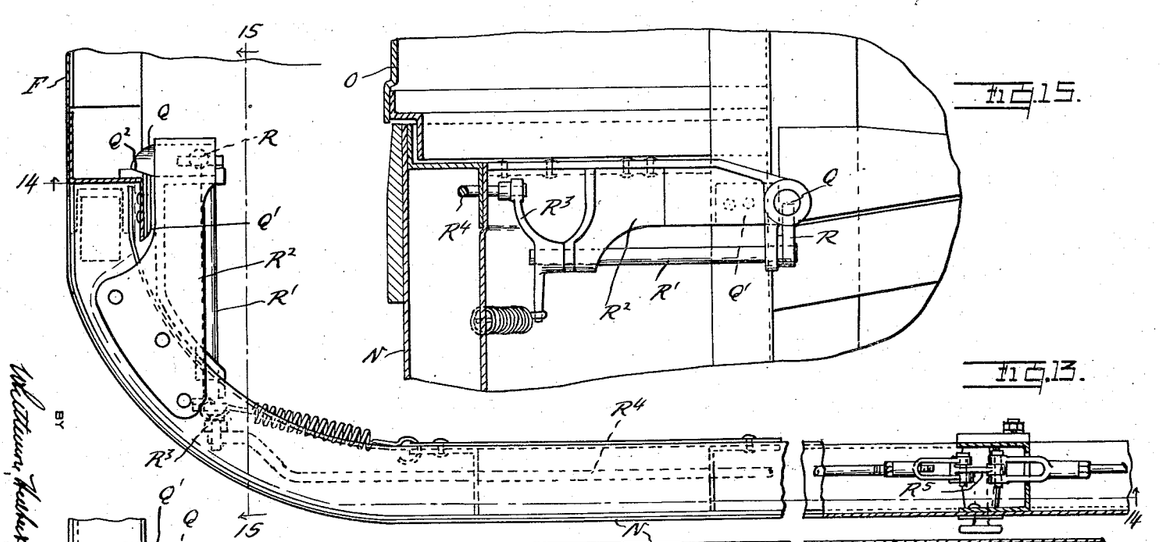
Figure 13 is a horizontal section through the tail gate showing the locking mechanism therefor.
Figure 15 is a section on line 15—15 of Figure 13.
Figure 14:
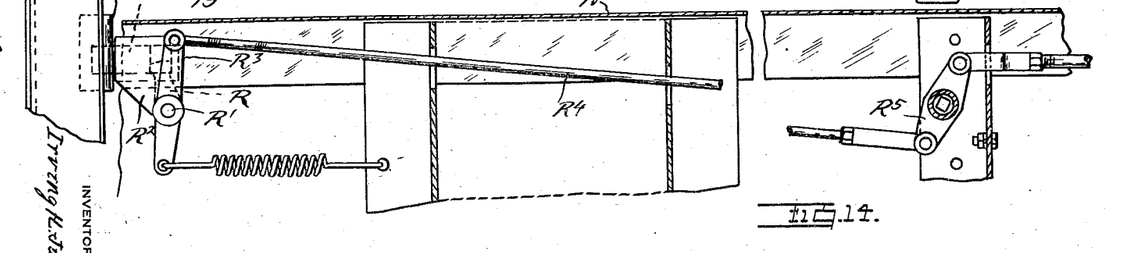
Figures 14 is a section taken on the line 14—14 of Figure 13.
Figures 20, 21, 22, 23:
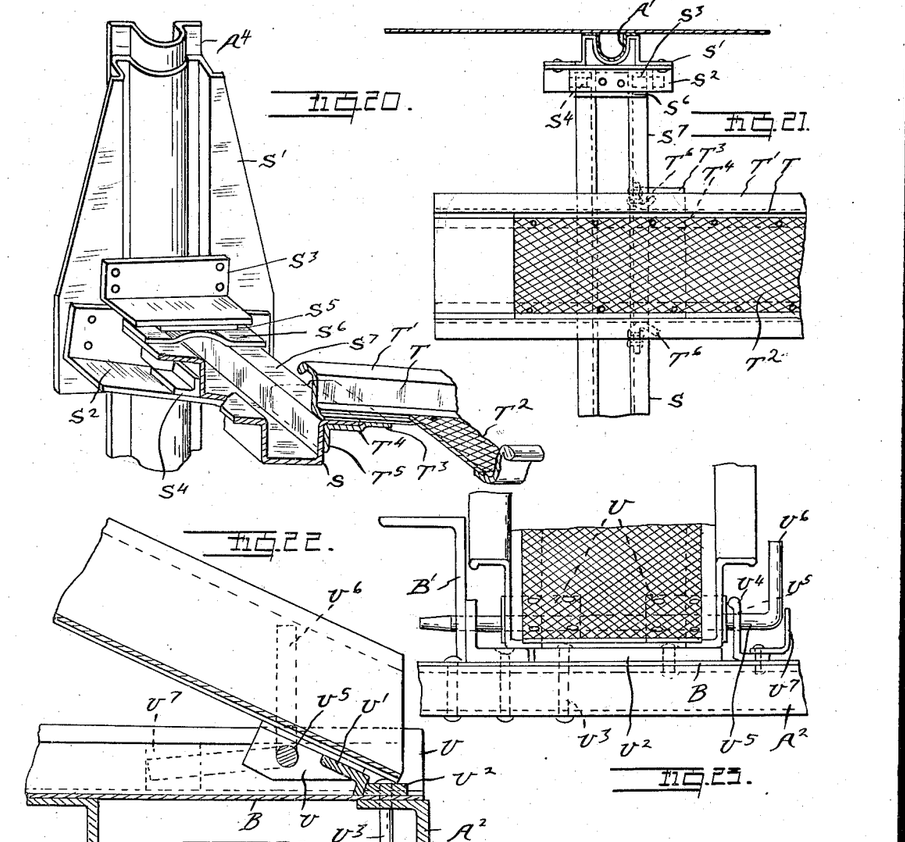
Figure 20 is an perspective view showing a modified form of track frame and the manner of supporting and locking the same on the main frame.
Figure 21 is a plan view thereof.
Figure 22 is a longitudinal section of the lower end of the frame showing the manner of locking the same to the floor.
Figure 23 is an end elevation of Figure 22.
Figure 24:
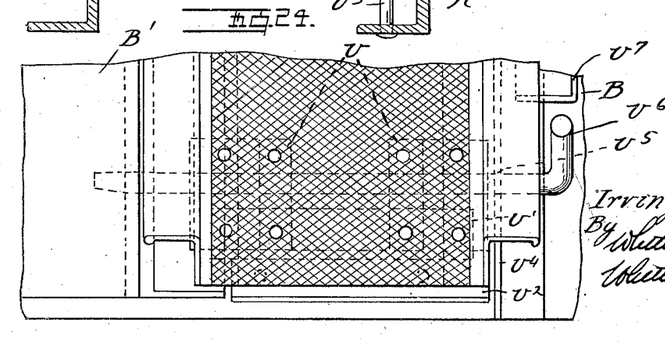
Figure 24 is a plan view thereof.
Figure 25:
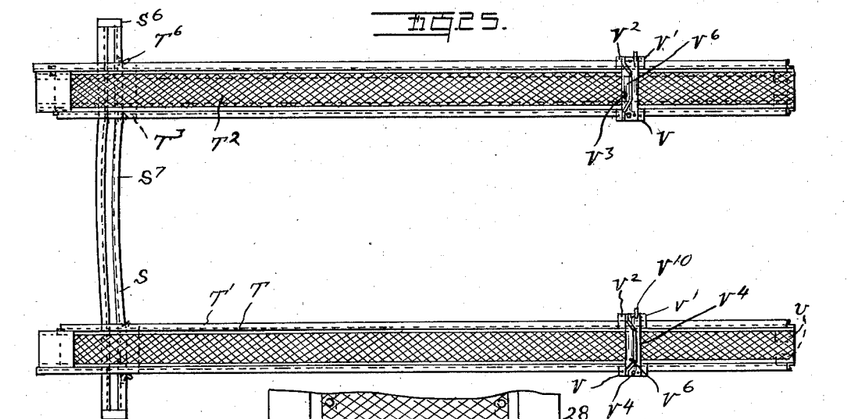
Figure 25 is a plan view of the assembled track frame.

The rear end of the transport is closed by a tail gate N which is hinged at its lower end and serves as a skid for entering the car G' into engagement with the tracks K'. This tail gate has preferably rounded side portions which align with the sides of the body and assist in imparting a streamlined form. Inasmuch, however, as the gate is also to serve as a skid or runway, it does not extend completely to the top of the body, but abuts against a complementary hinged tail gate section O. The latter is also of a rounded streamlined form and is hinged at its top so that to open the end of the transport the section O must be swung upward while the section N is swung downward. These two movements are preferably accomplished simultaneously by a link between the two members N and O which is of the following construction: The tail gate section O has pivotally attached thereto a link rod P which at its opposite ends is provided with a roller P' engaging a track P² at the side of the body. Connected to this link P' is a flexible cable P³ having its opposite end attached to the tail gate N. The arrangement is such that when the tail gate N is swung downward, this will pull upon the cable P³, drawing the link P rearward and through the engagement of the roller P' with the track P² lifting the tail gate section O so as to clear the opening in the body. On the other hand, when the tail gate N is swung forward in closed position, this, by releasing tension of the cable P³, will permit the section O to close by gravity. The tail gate is also preferably provided with a locking mechanism which will retain it in closed position, but which can be released at any time for access to the carrier of the body. This mechanism is shown in Figures 13 to 15, inclusive, and is of the following construction:

On the opposite sides of the tail gate are mounted latch bolts Q which are adapted in the closing of the gate to ride over flanges Q' on the body and to engage keepers Q². These latch bolts are actuated by rock arms R on rock shafts R' which are mounted on brackets R² secured to the curved sides of the gate. The rear ends of these rock shafts R' have rock arms R³ which have attached thereto rods R⁴ extending to the center of the gate. Here the ends of the rods upon the opposite sides of the car are attached to a common lever R⁵ pivotally mounted on the gate and having a polygonal central aperture therein for engagement by an operating key. The arrangement is such that when the gate is to be opened, the operator inserting the key into the polygonal socket can turn the lever R⁵ which through the rods R⁴, rock arms R³, rock shafts R' and rock arms R will actuate the bolts Q to withdraw them simultaneously from their keepers.

Figure 2:
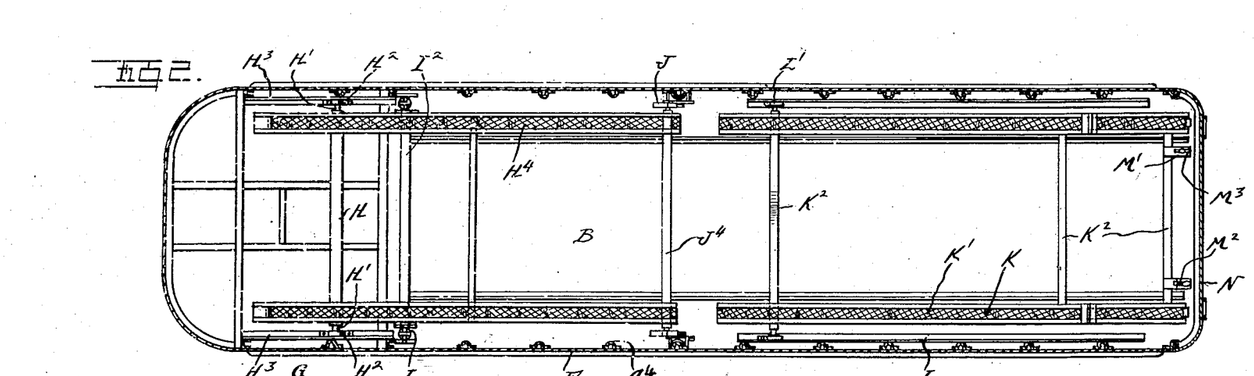
Figure 2 is a horizontal section on line 2—2 of Figure 1.

With the construction as described, the transport may be used for carrying different types of cars and trucks. Thus, as shown in Figure 1, three automobiles are loaded within the transport body. In Figure 2 there is but one passenger car, together with a truck which occupies all of the space in the rear portion of the transport. In Figure 11 two passenger cars are loaded respectively on the forward track members H⁴ and the rear track members K', while between and beneath these members there is loaded a truck G³. The track members H⁴ and K' are curved longitudinally, thereby providing a greater clearance beneath the same than would be the case with straight tracks. The swinging of the forward track members forms a simple and effective means for elevating the forward car, it being only necessary to lift a portion of the weight, as the rear wheels of this car rest upon the tracks in rear of the pivot and therefore partly counterbalance the load.

Figures 20 to 25 show a modified construction of removable track which is used both as a skid and for supporting the upper tier rear car. With the construction previously described, the tracks are permanently connected with cross bars constituting a frame which must be handled as a unit. With the modified construction, the cross bar and track members are separable from each other so that the operator need only lift one at a time, the construction being as follows: S is a cross beam adapted to extend across between the sides of the transport. This cross bar S is supported on a bracket member S' which is secured at a suitable height to one of the upright members A⁴. S² is an angle bar secured to the bracket S' which forms the lower support for the cross bar S, and S³ is an angle bar also secured to the bracket S' above the cross bar. The outwardly extending flanges of the angle bars S² and S³ are not parallel, but are inclined toward each other at their inner ends to form a tapering socket. A stop S⁴ is secured to the lower angle bar S² which limits the inward movement of the cross bar S, and a resilient pad S⁵ is attached to the underside of the upper angle bar S³. This engages an upwardly bowed member S⁶ secured to the end of the cross bar S and thus a cushion is formed which holds the bar from vibration.

The track members T are detachably engaged with the cross bar S and are properly positioned thereon and are spaced from each other by the following construction: The cross bar S is preferably a channel bar having outwardly extending top flanges S⁷ on which the bottom of the track T is supported. The track is also of a channel cross section being preferably formed by spaced Z-bars T', the lower flanges of which are cross connected by a plate T² suitably roughened on its upper surface to increase traction with the tires of the automobile. Secured to the bottom of the track T is a cross bar T³, the forward portion T⁴ of which is offset to be spaced from the bottom an amount equal to the thickness of the flange S⁷. The end of the portion T⁴ is turned downward to form a stop T⁵ which, when the track T is moved over the cross bar S to engage the offset T⁴ beneath the flanges S⁷, will contact with the channel portion of said cross bar and prevent further movement. To position the track T laterally upon the cross bar S, there are flaring guide flanges T⁶ secured to the cross bar S to be upon opposite sides of the stop T⁵ when engaged with said cross bar.

The tracks T are longitudinally bowed and at their rear ends are provided with means for securely attaching the same to the floor of the transport. This securing means comprises angle brackets U rigidly attached to the under side of the track and having their downwardly extending flanges beveled to be parallel with the floor. U' is an angle bar extending between the members U and forming a shoulder for engaging an abutment on the floor of the car. This abutment U² is a bar extending transversely being rigidly secured to the floor B and to the end cross bar A' by bolts or rivets U³. The bar U² also forms a bearing for engaging the end of the track member T and supporting the same when under load. The lower end of the track is laterally positioned on its outer side by the beam B' and on its opposite side by an angle bar U⁴ secured to the floor. The track is then locked in this position by a pin U⁵ which passes through registering apertures in the members U⁴, U and web of the beam B'. This pin has a handle portion U⁶ which may be turned into engagement with a stop U⁷ on the floor to lock the pin U⁵ from disengagement.

Figures 26, 27:
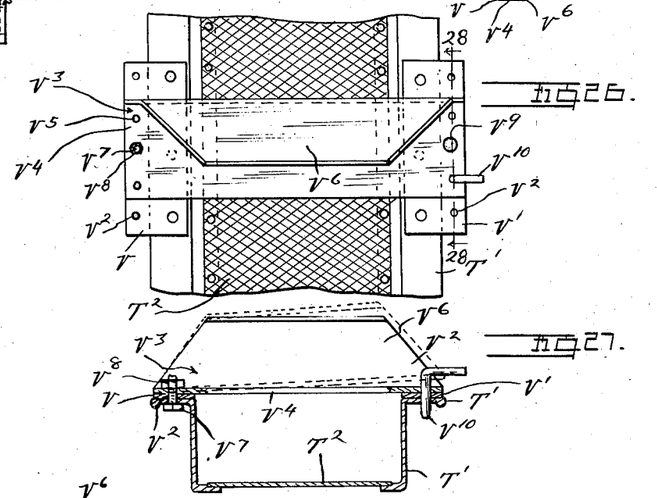
Figure 26 is a plan view of the chock for holding the vehicle wheels on the track.
Figure 27 is a cross section through said chock and the track to which it is secured.
Figure 28:
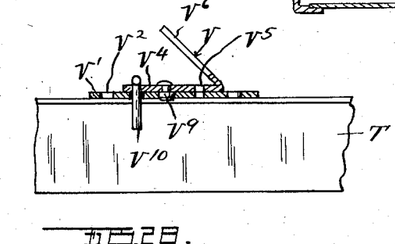
Figure 28 is a section on line 28—28 of Figure 26.

With the construction just described, when it is necessary to shift the tracks from position for use as a skid to a position for supporting an elevated car within the transport body, or for supporting a car in the lower tier, it is not necessary to lift both tracks and the connecting cross bar at the same time as each of these members may be separately handled. Thus, as previously described, the cross bar S may be engaged in the tapering sockets on opposite sides of the transport body formed by the members $S^2$ and $S^3$, while the stop $S^4$ will limit inward movement in each socket. The track members T may then be engaged one at a time with the cross bar S, the offset flange $T^4$ engaging the flange $S^7$, the flange $T^5$ forming a stop, and the guide flanges $T^6$ determining the lateral position. The lower ends of the track members T may then be engaged with the stop $U^2$ and finally locked by engagement of a pin $U^5$ with the apertured flanges U, $U^4$ and B'. When thus secured, the car may be driven up the tracks T and will clear the next forward car in the lower tier. It is, however, necessary to provide means on these tracks for holding the car from downward movement thereon, and I therefore provide for this purpose the following construction: V and V' are plates secured to the outwardly extending upper flanges of the Z-bars T' on opposite sides of the track T. These plates V and V' are provided with a series of apertures $V^2$. Chocks $V^3$ extend across and rest upon the plates V and V'. Preferably each chock $V^3$ has a base $V^4$ provided with apertures $V^5$ registrable with the apertures $V^2$, and has an upwardly extending flange $V^6$ at the proper angle to engage the tire of a wheel supported upon the track. Each chock $V^3$ is secured to the track on one side by a bolt $V^7$ which may be engaged with any one of the apertures $V^5$ and a registering aperture $V^2$. A nut $V^8$ engages this bolt above the base $V^4$, and the construction and arrangement is such that the chock $V^3$ may be swung and tilted slightly about the bolt $V^7$ when desired. On the opposite side the base $V^4$ of each chock $V^3$ is provided with a permanently fixed downwardly projecting pin $V^9$ adapted to engage with the apertures $V^2$ to take the load of the car against flange $V^6$ of the chock. In addition to this pin, there is a long safety locking pin $V^{10}$ which may be engaged with an aperture $V^5$ in the base of the chock $V^3$ and one of the apertures $V^2$. In use, this pin $V^{10}$ will prevent the chock $V^3$ from swinging around the bolt $V^7$ if for any reason the shorter pin $V^9$ should become disengaged from the aperture $V^2$ in which it is located while the vehicle is in transit. One point of advantage of this construction is that when the chock is under load of the automobile on the track with the pressure of the tire against the flange $V^6$, it would be difficult to withdraw the pin $V^{10}$ if this alone were supporting the load. On the other hand, with the construction as shown, the pin $V^9$ will relieve the pin $V^{10}$ from such load and will permit ready withdrawal of the latter. The chock $V^3$ may then be swung around the bolt $V^7$ to permit the automobile on the track to be unloaded.

Figure 3:
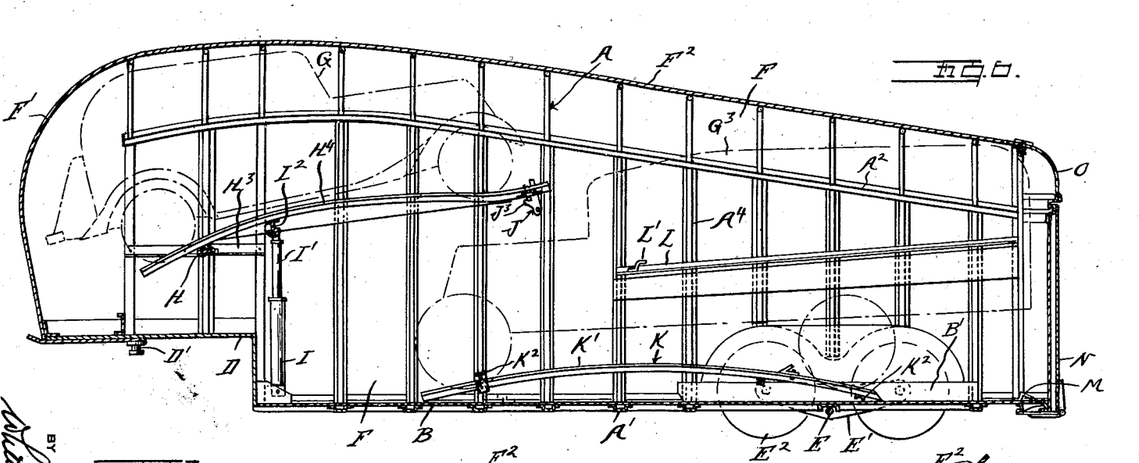
Figure 3 is a transverse section on line 3—3 of Figure 1.
Figure 4:
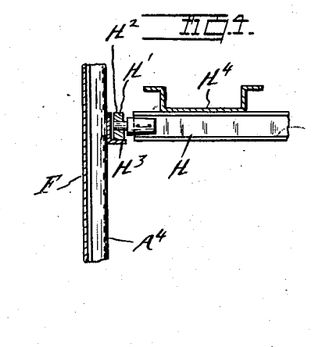
Figure 4 is a section on line 4—4 of Figure 1.
Figure 5:
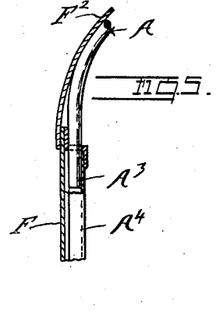
Figure 5 is a section on line 5—5 of Figure 1.
Figures 7, 8, 9, 10:
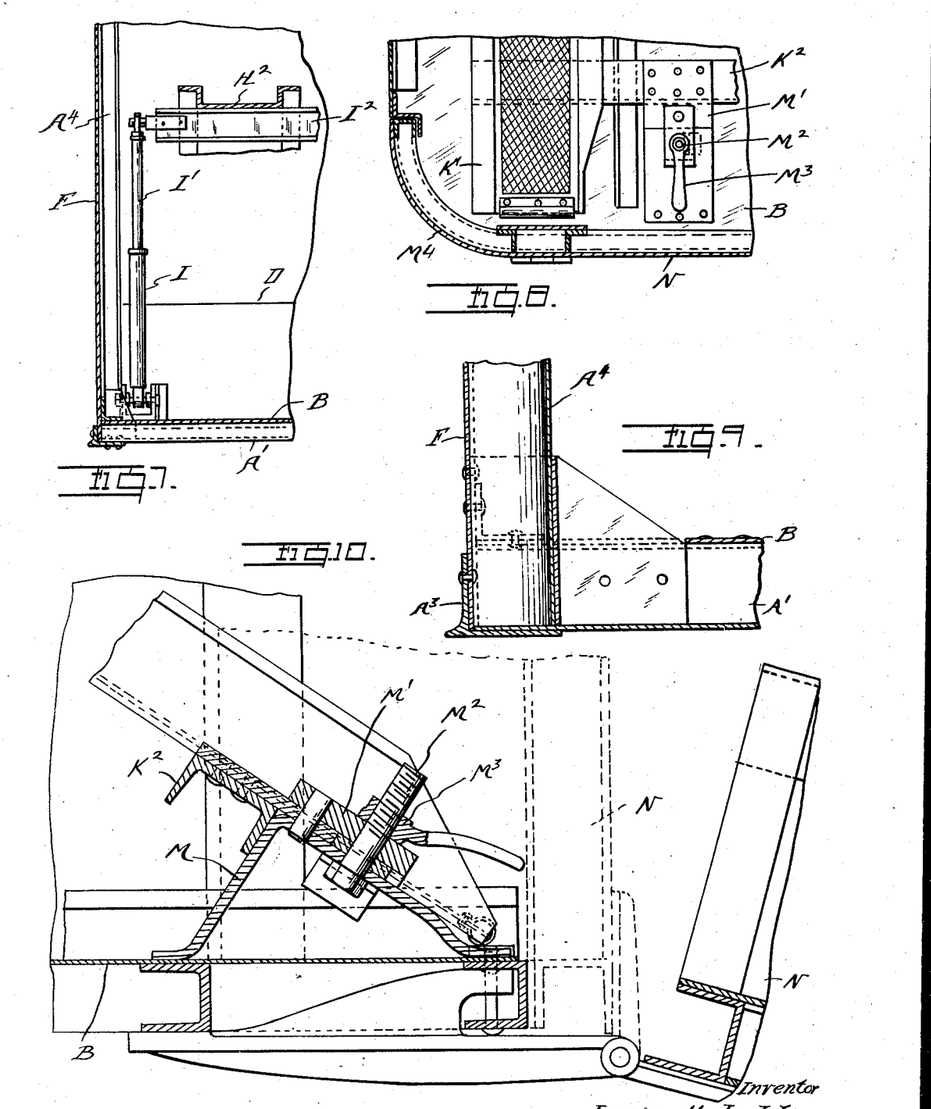
Figure 7 is a cross section illustrating the jack for hoisting the tracks.
Figure 8 is a horizontal section through the end gate.
Figure 9 is a section on line 9—9 of Figure 30.
Figure 10 is an enlarged vertical section showing the locking means for the rear track members.
Figure 9:
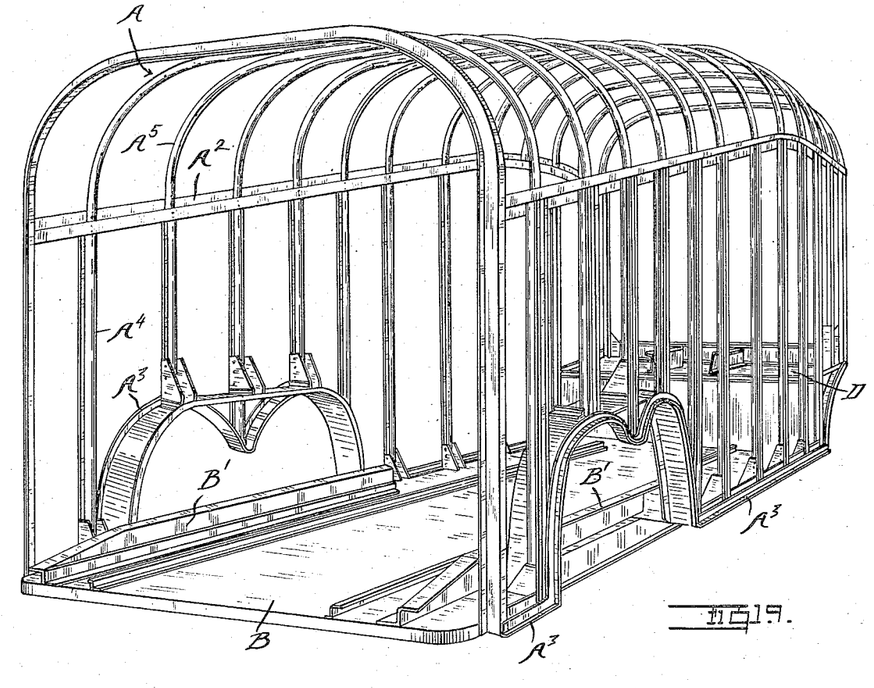
Figure 10:
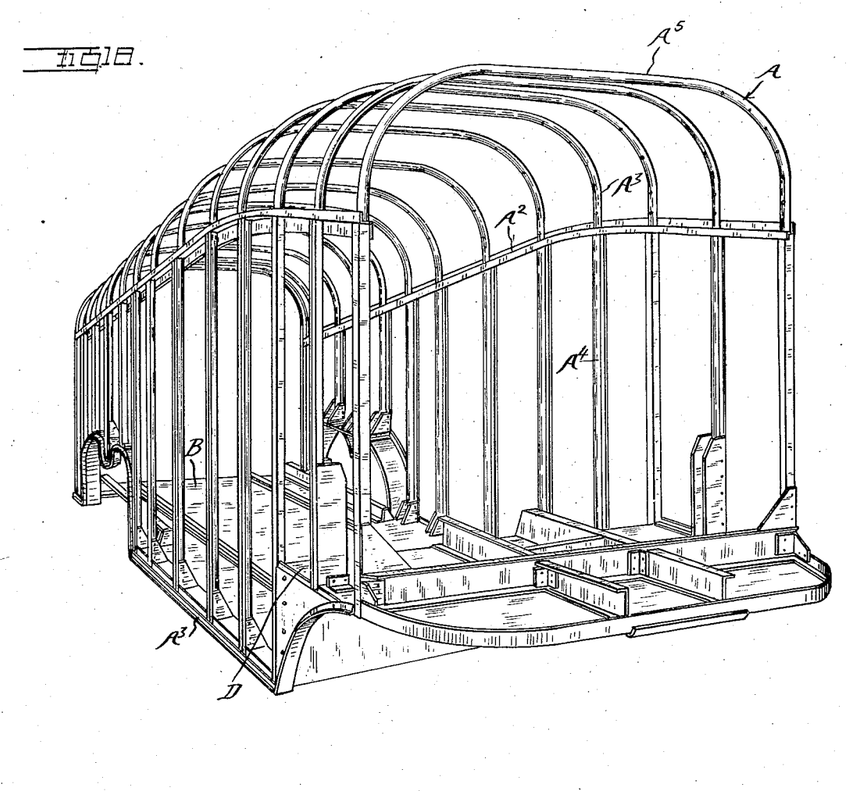
Figure 29:
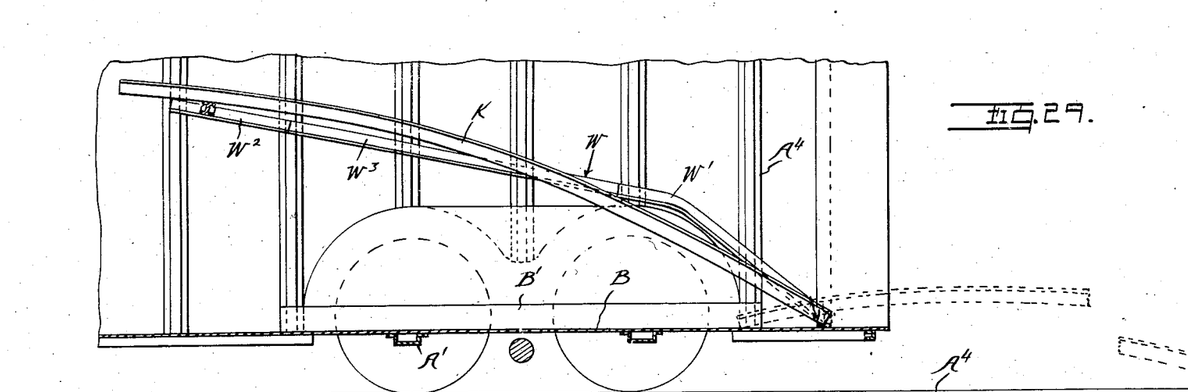
Figure 29 is a side elevation showing another modification.
Figure 30:
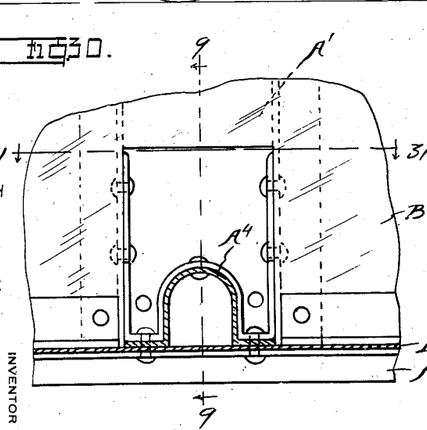
Figure 30 is a section on the line 30—30 of Figure 31.
Figure 31:
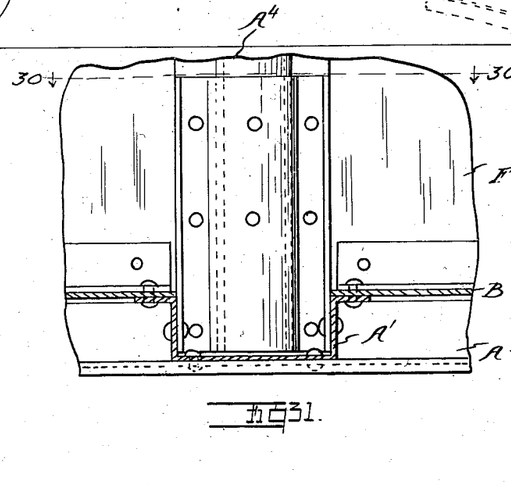
Figure 31 is a section on the line 31—31 of Figure 30.

As previously described, the cross bar $K^2$ of the unit track frame K illustrated in Figures 1, 3 and 6 is provided with rollers $K^3$ at its opposite ends which are adapted to run upon track members L, and the latter are secured to the sides of the transport so as to incline slightly downward from the rear end to the front end thereof. Thus, to engage the track frame K with the track L, it is first necessary to lift its forward end to the height of the rear end of said tracks L. However, with the modified construction shown in Figure 29, a track W is employed instead of track L and is inclined upwardly and forwardly from the rear end of the transport. Such an arrangement might, however, interfere with the loading into the transport of a forward car should the latter have any portion of greater width than the distance between the tracks W. This difficulty has been avoided by making the track W of several sections including a lower section W', an upper section $W^2$, both of which are rigidly attached to the sides of the transport and an intermediate section $W^3$ which is detachably secured and may be removed if necessary for the introduction of a car. The removable section $W^3$ is so located as to be at the height where the greatest clearance is required, while the sections W' and $W^2$ are respectively below and above said point. With this construction the rollers $K^3$ of the unit track frame K may be engaged with the lower end of the track W and then moved upwardly along the track W so that the forward end thereof will be elevated to the desired height for automobile carrying purposes.

What I claim as my invention is:

1. A movable track frame for use in a motor vehicle transport comprising a channel cross bar having laterally extending top flanges, elevated socket bearings on said transport with which the ends of said cross bar may be laterally engaged, a pair of tracks supported on said cross bar and detachably engaging a lateral flange thereof, and means adjacent to the floor of the transport for engaging the ends of said tracks to hold the same from movement and to thereby maintain the engagement between said tracks and cross bar and the cross bar and its supporting bearings.

2. In an enclosed trailer having side walls, a deck between said side walls for carrying an automobile, and elevated means adapted to be loaded from said deck for carrying another automobile forwardly of and in an elevated position relative to the first mentioned automobile, the combination therewith of inclined means loaded from said deck for carrying another automobile rearwardly of and in an elevated position relative to the first mentioned automobile, said means being supported at its forward end in an elevated position by said side walls and being supported at its rear end by said deck.

3. In an enclosed trailer having a deck for carrying an automobile, and elevated means for carrying another automobile forwardly of and in an elevated position relative to said first mentioned automobile, the combination therewith of inclined means loaded from said deck for carrying another automobile rearwardly of and in an elevated position relative to said first mentioned automobile, and means within and carried by the enclosed trailer for supporting the forward end of the inclined means just mentioned in an elevated position relative to said deck, the rear end of said inclined means being supported on said deck.

4. In an enclosed trailer having side walls, and a deck between said side walls for carrying an automobile, the combination therewith of inclined means loaded from said deck for carrying another automobile rearwardly of and in an elevated position relative to the first mentioned automobile, said means being supported at its forward end in an elevated position by said side walls and being supported at its rear end on said deck.

5. In an enclosed trailer having a deck for carrying an automobile, the combination therewith of inclined means loaded from said deck for carrying another automobile rearwardly of and in an elevated position relative to said first mentioned automobile, and means within and carried by the enclosed trailer for supporting the forward end of the inclined means just mentioned in an elevated position relative to said deck, the rear end of said inclined means being supported by said deck.

6. In a trailer having a deck for carrying an automobile, and track supports in an elevated position relative to said deck, the combination therewith of an inclined track loaded from said deck for carrying another automobile rearwardly of and in an elevated position relative to the first mentioned automobile, said track having separable sections supported at their forward ends in an elevated position by the elevated track supports aforesaid and supported at their rear ends by said deck.

7. In a trailer having a deck for carrying an automobile, the combination therewith of brackets carried by said trailer at opposite sides thereof in elevated positions relative to said deck, inclined means loaded from said deck for carrying another automobile rearwardly of and in an elevated position relative to said first mentioned automobile, said means being formed of separable sections including a crossbar supported by said elevated brackets, and inclined track members separately supported at their forward ends in an elevated position by said crossbar and supported at their rear ends by said deck.

8. A movable track frame for use within an enclosed vehicle transport having a floor, comprising a crossbar, elevated socket bearings within said transport with which the ends of said crossbar may be laterally engaged, an inclined track having its upper end detachably supported on said crossbar and having its lower end detachably supported on the floor of said transport, and means for maintaining said track in engagement with said crossbar and floor.

9. In a trailer having side walls and a deck between said side walls for carrying an automobile, the combination therewith of an inclined track loaded from said deck for carrying another automobile rearwardly of and in an elevated position relative to the first mentioned automobile, and means including inclined rails carried by the side walls of the trailer for supporting the forward end of said inclined track in an elevated position relative to said deck, the rear end of said track being supported on said deck, portions of said rails being fixed to and rigid with said side walls, and other portions of said rails being removable to permit movement by the fixed portions of the rails of portions of the first mentioned automobile while being loaded on or unloaded from said deck.

10. In a trailer having a deck for carrying an automobile, and upright portions at opposite sides of said deck, the combination therewith of a downwardly and rearwardly inclined track loaded from said deck for carrying another automobile rearwardly of and in an elevated position relative to the first mentioned automobile, and elevated means carried by the trailer for supporting the forward end of said inclined track, the rear end of said track being supported on said deck, said elevated means including inclined rails having end portions rigid with the upright portions of the trailer and having intermediate portions removable to permit movement between the fixed end portions of the rails of portions of the first mentioned automobile while being loaded on or unloaded from said deck.

11. In a trailer having a deck for carrying an automobile, and elevated means for carrying another automobile forwardly of and in an elevated position relative to said first mentioned automobile, the combination therewith of inclined means loaded from said deck for carrying another automobile rearwardly of and in an elevated position relative to said first mentioned automobile, and means carried by the trailer for supporting the forward end of the inclined means just mentioned in an elevated position relative to said deck, the rear end of said inclined means being supported on said deck.

IRVING H. JUDD.